(12) United States Patent
Mattes

(10) Patent No.: US 6,688,639 B2
(45) Date of Patent: Feb. 10, 2004

(54) AIRBAG MODULE

(75) Inventor: Bernhard Mattes, Sachsenheim (DE)

(73) Assignee: Robert Bosch GmbH, Stuttgart (DE)

( * ) Notice: Subject to any disclaimer, the term of this patent is extended or adjusted under 35 U.S.C. 154(b) by 22 days.

(21) Appl. No.: 10/069,194

(22) PCT Filed: May 29, 2001

(86) PCT No.: PCT/DE01/02037

§ 371 (c)(1),
(2), (4) Date: Jul. 8, 2002

(87) PCT Pub. No.: WO01/98116

PCT Pub. Date: Dec. 27, 2001

(65) Prior Publication Data

US 2002/0171229 A1 Nov. 21, 2002

(30) Foreign Application Priority Data

Jun. 21, 2000 (DE) .......................... 100 30 471

(51) Int. Cl.$^7$ ................................ B60R 21/16
(52) U.S. Cl. .................................. 280/728.2
(58) Field of Search ................... 280/728.2, 731, 280/743.1, 735

(56) References Cited

U.S. PATENT DOCUMENTS

| | | | |
|---|---|---|---|
| 4,938,504 A | * 7/1990 | Fukuda et al. | ............... 280/731 |
| 4,974,873 A | 12/1990 | Kaiguchi et al. | |
| 5,303,952 A | * 4/1994 | Shermetaro et al. | ......... 280/731 |
| 5,584,501 A | * 12/1996 | Walters | .................... 280/728.2 |
| 6,007,087 A | 12/1999 | Spindler-von Dreyse et al. | |
| 6,457,743 B1 | * 10/2002 | Steffens, Jr. | ................. 280/731 |

FOREIGN PATENT DOCUMENTS

| | | |
|---|---|---|
| DE | 198 55 838 | 6/2000 |
| EP | 0 565 209 | 10/1993 |

* cited by examiner

Primary Examiner—Son T. Nguyen
(74) Attorney, Agent, or Firm—Kenyon & Kenyon

(57) ABSTRACT

An airbag that can be removed from its receiving shaft in the vehicle and reinserted again without any special tools is described.

Figure 1:
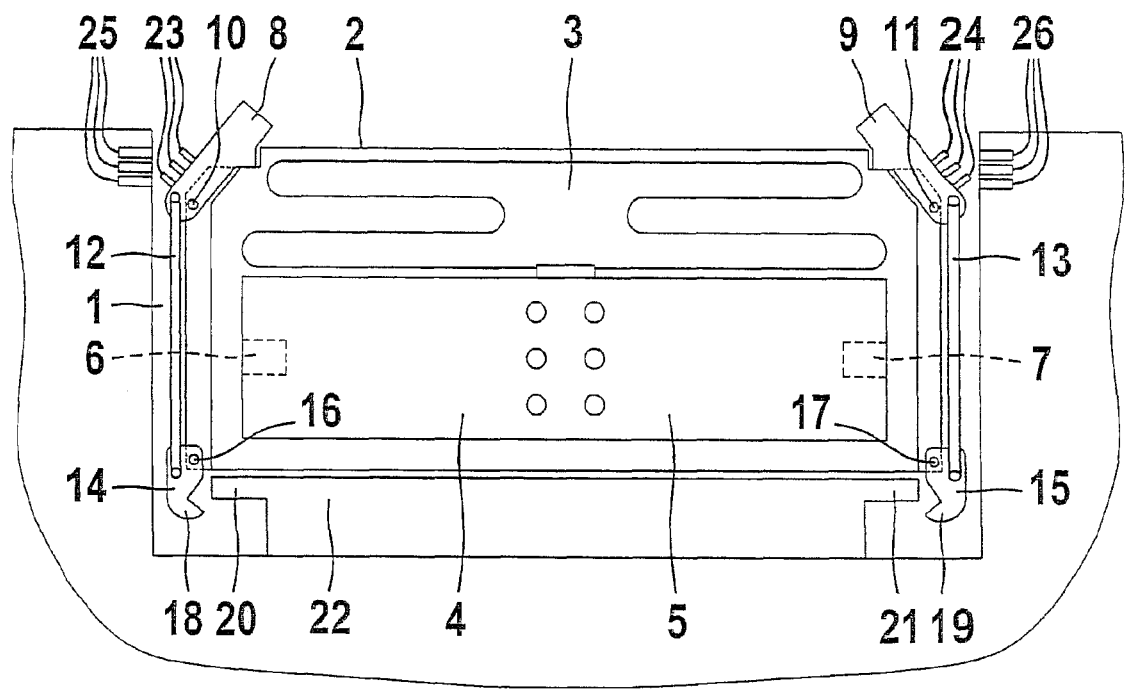

The airbag module (2) is provided with a locking device (8, 9, 12, 13, 14, 15) and electric contacts (23, 24, 25, 26) which cause the airbag module (2) to be mechanically locked when inserted into a receiving shaft (1) provided in the vehicle and cause an electric connection to be established between at least one ignition device (6, 7) and a controller. The locking device (8, 9, 12, 13, 14, 15) and the electric contacts (23, 24, 25, 26) are designed so that when the airbag module (2) is inserted into the receiving shaft (1), it is first locked mechanically and then the electric contact is established, and on removal of the airbag module (2) from the receiving shaft (1), the electric contact is released first and then the mechanical lock is released.

6 Claims, 1 Drawing Sheet

AIRBAG MODULE

BACKGROUND INFORMATION

The present invention relates to an airbag module which has a gas generator, an ignition device and an airbag, and which is provided with a locking device and an electric contacting device which cause the airbag module to be mechanically locked when inserted into a receiving shaft provided in the vehicle and cause an electric connection to be established between the ignition device and a controller.

U.S. Pat. No. 6,007,087 describes such an airbag module, which may be inserted into a receiving shaft on the steering wheel. The locking device and the electric contacting are designed so that when the airbag module is inserted into the receiving shaft without the use of a tool, it is automatically locked mechanically and an electric connection is established between the airbag module and a controller. However, a special tool is needed to remove the airbag module from the receiving shaft. This facilitates insertion of the airbag module into the receiving shaft, but makes removal of the airbag module difficult.

There are situations in which an airbag should be deactivated urgently, so that it will not be deployed in the event of a vehicular crash. This is particularly true of the passenger airbag when a child or person of relatively small height is sitting in the passenger seat. Experience has shown that airbag deployment may cause severe or even fatal injuries to such persons. Airbag deployment should be suppressed in any case, not only when the passenger seat is occupied by a child or a short adult, but also when occupied by any object such as an item of baggage. There are methods for detecting the type of occupancy of the seat, and then when a certain type of occupancy is detected, the controller for the passenger airbag blocks its deployment in the event of a vehicular crash. Passenger airbag deployment must also be prevented if a child seat, in particular a child seat facing the rear, is positioned on the passenger seat. There are detection systems which deliver "do not deploy" information to a controller for the passenger airbag when a child seat is placed on the passenger seat. In the simplest case, the driver or passenger is able to deactivate the passenger airbag by simply operating a switch whenever one of the above-mentioned seat occupancy situations occurs.

With all these methods, only the transmission of ignition commands to the ignition device of the passenger airbag is suppressed. However, since the airbag together with its gas generator and its ignition device remain installed in the vehicle, there is the danger that it may nevertheless be deployed in error, e.g., because of an electrostatic discharge. False deployment may also occur due to an excessively high temperature, e.g., when there is a fire in the vehicle. A 100% safety against faulty deployment of the airbag may be achieved only by removing the entire airbag module together with the gas generator and the ignition device from the vehicle. Not just those skilled in the art but also the driver and/or the passenger should be capable of removing the airbag module from the vehicle and reinstalling it again without using any tools.

Therefore, the object of the present invention is to provide an airbag module of the type defined in the preamble which may be installed and removed with only a few manipulations. There should be no possibility of the airbag being deployed due to improper handling.

ADVANTAGES OF THE INVENTION

This object is achieved with the features of claim 1 by the fact that the airbag module is provided with a locking device and an electric contacting device which cause the airbag module to be mechanically locked when inserted into a receiving shaft provided in the vehicle and cause an electric connection to be established between the ignition device and a controller. The locking device and the electric contacting device are designed so that when the airbag module is inserted into the receiving shaft, it is first locked mechanically and then the electric contact is established, and on removal of the airbag module from the receiving shaft, the electric contact is released first and then the mechanical lock is released.

An airbag module having the features mentioned above may be removed from the receiving shaft and reinserted again with just a few manipulations without the use of special tools. Thus anyone, for example, the driver or the passenger, may uninstall the passenger airbag in particular to have 100% certainty that the passenger airbag will not be deployed when the occupancy situation of the passenger seat requires this. The sequence of mechanical locking and electric contacting claimed according to the present invention guarantees that deployment signals cannot in any case be transmitted to the airbag module if the airbag module is not securely locked in the receiving shaft. If the airbag module is first locked in the receiving shaft and subsequent electric contacting is possible only after correct locking, this rules out the possibility of an improperly locked airbag module being deployed. In a rear-end collision, for example, an incorrectly locked airbag module might be ripped out of the receiving shaft and might injure occupants of the vehicle.

Advantageous refinements of the present invention are derived from the subclaims.

Preferably at least one operating element is provided which is connected at one end to the locking device which establishes a frictional connection between the airbag module and a supporting frame in the receiving shaft and at the other end is connected to a contacting device which establishes a connection between contacts on the airbag module and the corresponding contacts in the receiving shaft. The operating element is advantageously a lever which is accessible from the front side of the airbag module facing out of the receiving shaft and is pivotable in two directions. When the lever is pivoted in one direction, first the locking occurs and then the electric contacting, and when the lever is pivoted in the other direction, first the electric contacts are released and then the lock is released.

It is expedient that the contacts of the ignition device are automatically short circuited on removal of the airbag module from the receiving shaft. With this short circuit, the controller detects that the airbag module has been removed together with its ignition device and the controller is then able to activate an airbag deactivation display in the vehicle.

The contacting device may be composed of connector pins and jacks, the connector pins or the jacks being arranged on the airbag module and the jacks or the connector pins being arranged in the receiving shaft. The contacting device is likewise composed of a transformer having a first pot-type core having one or more windings and a second pot-type core having one or more windings, one of the two pot-type cores being arranged on the airbag module and the other pot-type core being arranged in the receiving shaft.

DRAWING

The present invention is explained in greater detail below on the basis of embodiments illustrated in the drawing.

Figure 2:
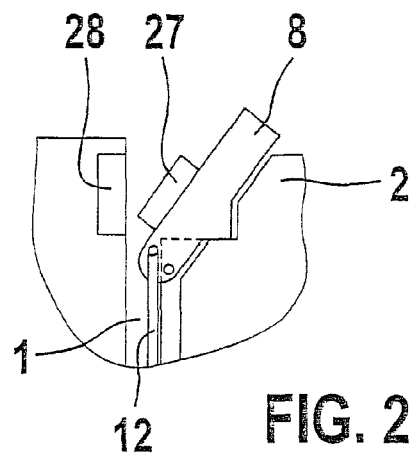

FIG. 1 shows a cross section through an airbag module inserted into a receiving shaft, and FIG. 2 shows an inductive contacting device for the airbag module.

DETAILED DESCRIPTION OF AN EMBODIMENT

FIG. 1 of the drawing shows a cross section through an airbag module 2 inserted into a receiving shaft 1. Airbag module 2 is composed essentially of a folded airbag 3, which in this embodiment is connected to two gas generators 4 and 5. With two gas generators 4, 5, there is the possibility of a two-step deployment of airbag 3. However, airbag module 2 may also be equipped with just a single gas generator. An ignition device 6, 7 is paired with each gas generator 4, 5. Ignition device 6, 7 of each gas generator 4, 5 is driven by a controller (not shown in the drawing) in the event of a vehicular crash. The controller is also performing constant diagnosis of ignition devices 6 and 7 by measuring the resistance of ignition devices 6, 7. If the resistance of respective ignition device 6, 7 differs from a predetermined value by more than a certain amount, the controller detects this as a malfunction and triggers a function display for the airbag in the motor vehicle accordingly. Likewise, it is possible to diagnose short circuits to the positive terminal or to ground of the battery voltage in the individual ignition devices or to adjacent ignition circuits.

Receiving shaft 1 for airbag module 2 may be located, for example, in the steering wheel or in the dashboard in front of the passenger seat or also in the side doors or in the seat backrests. A cover should be provided for receiving shaft 1 to allow receiving shaft 1 to be closed after removal of airbag module 2.

Airbag module 2 is equipped with operating elements in the form of two levers 8 and 9 which are accessible from the front side of airbag module 2 facing out of receiving shaft 1. With these levers 8 and 9, it is possible to mechanically lock airbag module 2 in receiving shaft 1, as explained below in greater detail, but also to establish an electric connection between ignition devices 6, 7 and a controller accommodated at any other location in the vehicle.

Two levers 8 and 9 are mounted pivotably in two directions about an axis 10, 11 on oppositions sides of airbag module 2 in the area of its front side. Each lever 8, 9 is connected by a rail 12, 13 to a locking bar 14, 15 which is also mounted pivotably about an axis 16, 17 on the side of airbag module 2 facing the interior of receiving shaft 1. Locking bars 14, 15 each have a catch projection 18, 19 which engages behind projections 20 and 21 in a supporting frame 22 anchored on the vehicle body in receiving shaft 1 when airbag module 2 is locked.

FIG. 1 of the drawing shows levers 8 and 9 pivoted in a direction in which locking bars 14 and 15 are not engaged, so that it is possible to remove airbag module 2 from receiving shaft 1. If levers 8 and 9 are pivoted in the other direction, locking bars 14 and 15 are moved toward supporting frame 22 over rails 12 and 13 so that then their catch projections 18 and 19 engage behind projections 20 and 21 on supporting frame 22. Airbag module 2 would thus be mechanically locked in receiving shaft 1.

Levers 8 and 9 are each provided with three plug pins 23 and 24 on the side facing the inside wall of receiving shaft 1. Jacks 25 and 26 which fit with plug pins 23 and 24 are provided in the wall of receiving shaft 1. Two of three plug pins 23 and 24 on levers 8 and 9 are connected to ignition element 6, 7 and the third of three plug pins 23, 24 is connected to ground on the housing of gas generators 4, 5. The figure does not show any connecting lines between ignition devices 6, 7 or the housing dimensions of gas generators 4 and 5 to plug pins 23, 24. Jacks 25 and 26 are also connected to a controller by connecting lines (not shown here).

If levers 8 and 9 are pivoted so that airbag module 2 is locked mechanically, plug pins 23, 24 are engaged in jacks 25, 26. Locking mechanism 8, 9, 12, 13, 14, 15 and electric contacting device 23, 24, 25, 26 are designed so that when levers 8 and 9 are pivoted in the locking direction, mechanical locking with supporting frame 22 takes place first and then connector pins 23, 24 engage in jacks 25 and 26. This means that when airbag module 2 is inserted into receiving shaft 1, mechanical locking is performed first and then the electric contacting. In the reverse case, when airbag module 2 is to be removed from receiving shaft 1, electric contact is released first and then the mechanical lock is released by moving levers 8 and 9.

Another variant of the contacting device is shown in FIG. 2, which illustrates a detail of airbag module 2 having a lever 8. This contacting device is composed of a transformer having a first pot-type core 27 having one or more windings and a second pot-type core 28 having one or more windings. One pot-type core 27 is arranged on lever 8 and another pot-type core 28 is arranged on the inside of receiving shaft 1. If lever 8 is pivoted outward to lock it, pot-type core 27 on lever 8 moves toward pot-type core 28 on the inside of receiving shaft 1, resulting in inductive coupling between pot-type cores 27 and 28, i.e. the windings in the pot-type cores. In this position of pot-type cores 27 and 28, signal transmission is possible between ignition device 6, 7 and the controller. By pivoting lever 8 in the other direction, pot-type cores 27 and 28 are separated from one another and the inductive coupling is interrupted.

The specific sequence of mechanical locking and electric contacting on insertion of airbag module 2 into and removal from receiving shaft 1 may of course be accomplished with mechanisms other than those illustrated as examples in the drawing. For example, it is also conceivable for the mechanical locking and electric contacting to be operated by electrically operable drive devices which are located in the side walls of receiving shaft 1 and are operated by pushing a button.

As soon as the electric contact is released for removal of airbag module 2 from receiving shaft 1, connector pins 23, 24 belonging to terminals of ignition devices 6, 7 should be automatically bridged with a short-circuit bridge. The short-circuit bridge is known to have contact springs which come in contact with connector pins 23, 24 when connector pins 23, 24 are removed from jacks 25, 26 and which are pushed away from connector pins 23, 24 on insertion of connector pins 23, 24 into jacks 25, 26.

What is claimed is:

1. An airbag module, comprising:
   a controller;
   a gas generator;
   an ignition device;
   an airbag,
   a locking device for mechanically locking the airbag module when inserted into a receiving shaft provided in a vehicle; and
   an electric contacting device for establishing an electric connection between the ignition device and the controller, wherein:
   the locking device and the electric contacting device are designed such that when the airbag module is inserted into the receiving shaft, first the mechanical locking and then the electric connection are established, and, upon removal of the airbag module from the receiving shaft, first the electric connection is released, and then the mechanical locking is released.

2. The airbag module according to claim 1, further comprising:

at least one operating element connected at one end to the locking device and for establishing a frictional connection between the airbag module and a supporting frame in the receiving shaft, the at least one operating element being connected at another end to the electric contacting device and establishing a connection between contacts on the airbag module and corresponding contacts in the receiving shaft.

3. The airbag module according to claim 2, wherein:

the at least one operating element includes a lever that is accessible from a front side of the airbag module facing out of the receiving shaft and that is pivotable in two directions, when the lever is pivoted in one direction, first the mechanical locking occurs and then the electric connection, and when the lever is pivoted in the other direction, first the electric connection is released and then the mechanical locking is released.

4. The airbag module according to claim 1, further comprising:

an arrangement for automatically short circuiting contacts of the ignition device on removal of the airbag module from the receiving shaft.

5. The airbag module according to claim 1, wherein:

the electric contacting device includes connector pins and jacks, one of the connector pins and the jacks being arranged on the airbag module, and one of the jacks and the connector pins being arranged in the receiving shaft.

6. The airbag module according to claim 1, wherein:

the electric contacting device includes a transformer having:

a first pot-type core that includes at least one winding, and a second pot-type core that includes at least one winding, one of the first pot-type core and the second pot-type core is arranged on the airbag module, and another one of the first pot-type core and the second pot-type core is arranged in the receiving shaft.

* * * * *

UNITED STATES PATENT AND TRADEMARK OFFICE
CERTIFICATE OF CORRECTION

PATENT NO. : 6,688,639 B2  
DATED : February 10, 2004  
INVENTOR(S) : Bernhard Mattes Page 1 of 1

It is certified that error appears in the above-identified patent and that said Letters Patent is hereby corrected as shown below:

Title page,  
Item [57], ABSTRACT, delete "(2), (8,9,12,13,14,15), (23,24,25,26), (2), (1), (6,7), (8,9,12,13,14,15), (23,24,25,26), (2), (1), (2), (1)"

Column 1,  
Line 3, change "BACKGROUND INFORMATION" to -- FIELD OF THE INVENTION --  
Between lines 10-11, insert -- BACKGROUND INFORMATION --  
Between lines 58-59, insert -- SUMMARY OF THE INVENTION --  
Line 59, change "the" to -- an --  
Line 60, delete "of the type defined in the preamble"  
Line 64, delete "ADVANTAGES OF THE INVENTION"  
Line 65, delete "with the features of Claim 1"

Column 2,  
Line 20, delete "claimed according to the present invention"  
Line 30, delete "Advantageous refinements...from the subclaims."  
Line 63, change "DRAWING" to -- BRIEF DESCRIPTION OF THE DRAWINGS --  
Line 64, delete "The present invention...in the drawing."

Column 3,  
Line 4, delete "OF AN EMBODIMENT"

Signed and Sealed this

Thirty-first Day of May, 2005

JON W. DUDAS  
*Director of the United States Patent and Trademark Office*